M. M. ENDERS.
CLEANER.
APPLICATION FILED JULY 14, 1916.
1,234,452.
Patented July 24, 1917.
2 SHEETS—SHEET 1.
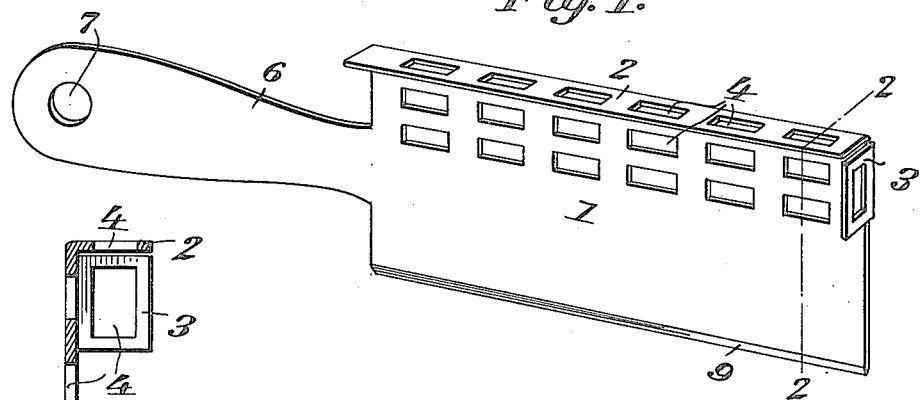
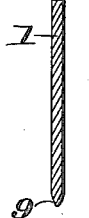
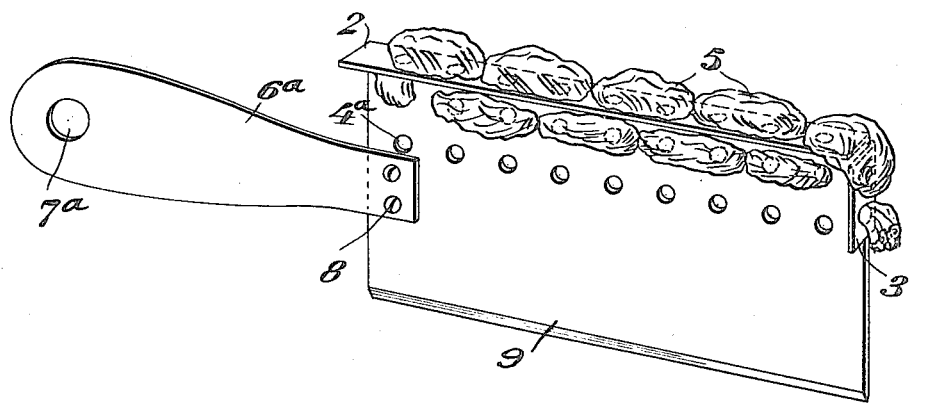
INVENTOR
Mattie M. Enders
WITNESSES
BY
ATTORNEY M. M. ENDERS.
CLEANER.
APPLICATION FILED JULY 14, 1916.
1,234,452.
Patented July 24, 1917.
2 SHEETS—SHEET 2.
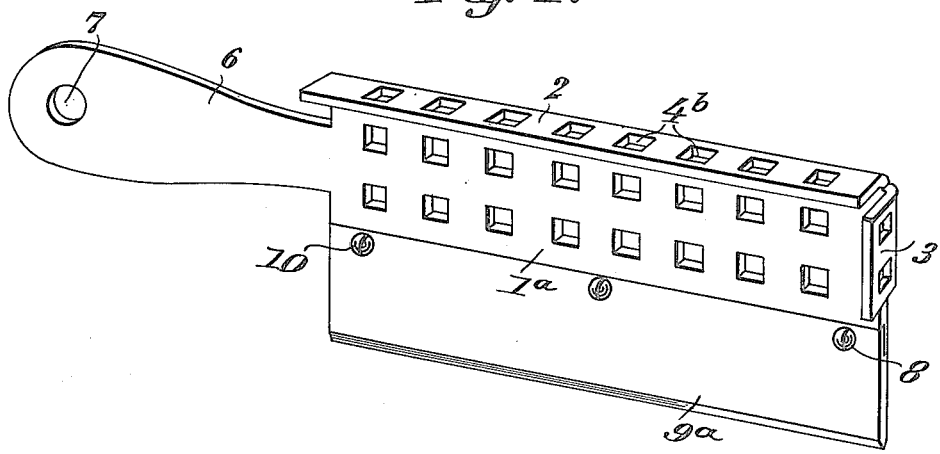
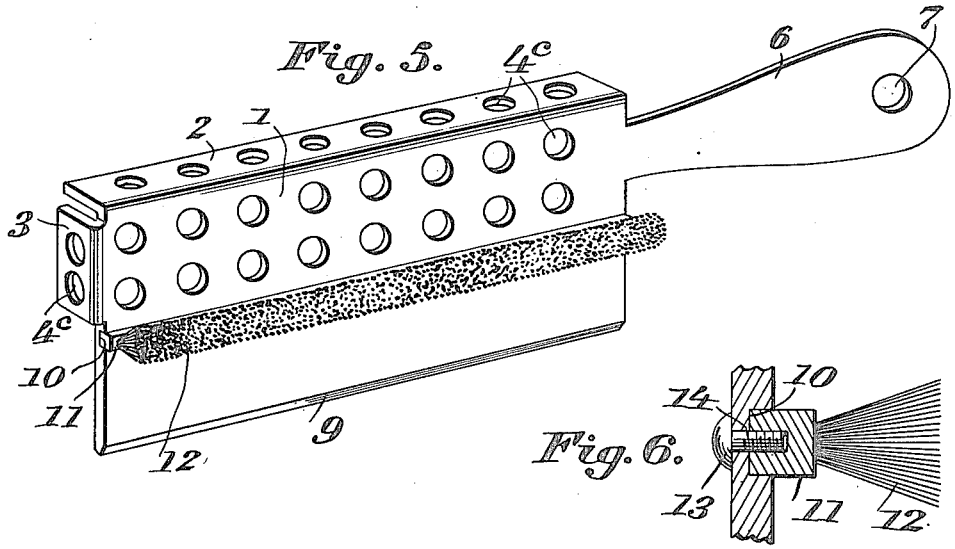
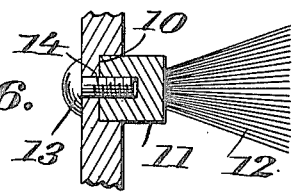
WITNESSES
INVENTOR
Mattie M. Enders
BY
ATTORNEY

UNITED STATES PATENT OFFICE.

MATTIE M. ENDERS, OF REDBIRD, NEBRASKA.

CLEANER.

1,234,452.   Specification of Letters Patent.   Patented July 24, 1917.

Application filed July 14, 1916. Serial No. 109,383.

*To all whom it may concern:*

Be it known that I, MATTIE M. ENDERS, a citizen of the United States, residing at Redbird, in the county of Holt and State of Nebraska, have invented certain new and useful Improvements in Cleaners, of which the following is a specification.

My invention relates broadly to cleaners and more particularly but not necessarily to shoe cleaners.

The primary object of my invention resides in the provision of a novel implement body having flanges thereon and provided with a plurality of openings in the body and flanges for removably receiving a piece or pieces of cloth to consequently provide shoe cleaning means and for serving as means for absorbing moisture when removing damp mud from the shoes, the invention also contemplating the provision of brush means for removable association with the body to serve as a means, primarily, for brushing dry mud and dirt from the shoes, said means being incidentally removable, at times, sterilized and reattached or else replaced by another similar brush means adapted for cleaning poultry.

Another object of this invention resides in the provision of a cutting edge on the body to serve as a means for scraping mud and dirt from the shoes, in some instances, the said edge being provided on a detachable blade of better material rendering it suitable for dressing poultry after it has been sterilized.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawing and pointed out in the claims forming a part of this specification.

In the drawings:

Figure 1 is a perspective of one form of my invention;

Fig. 2 is an enlarged transverse section taken on the line 2—2 of Fig. 1;

Fig. 3 is a perspective of another form of my invention;

Fig. 4 is a perspective of another form of my invention;

Fig. 5 is a perspective of still another form of my invention; and

Fig. 6 is an enlarged fragmentary transverse section of Fig. 5 showing to advantage a means for removably connecting the brush means to the body.

Referring more particularly to the drawings in which similar reference numerals designate like or corresponding parts throughout the different views, I provide my novel cleaner formed preferably of steel including a body 1 of a longitudinal configuration. A flange 2 is formed by bending one longitudinal edge of the body at right angles, while a lug 3 is formed integral with and extends at right angles from one end of the body, being positioned adjacent the flange 2. The body flange and lug are provided with a plurality of uniformly spaced openings. The size and configuration of these openings is immaterial and as will be noted in Fig. 1 they are oblong as indicated by the numeral 4; in Fig. 3 they are small and circular as at 4$^a$; in Fig. 4, square as at 4$^b$ and in Fig. 5 they are rather large and circular as at 4$^c$. A cloth 5 is interwound in the openings 4 in any desired manner, such as illustrated by Fig. 3. By this arrangement it will be readily apparent that I have provided a cleaning means that is preferably adapted for use on shoes. Also after the shoes have been scraped, in a manner to be hereinafter described, this cleaning means serves to absorb the moisture in the shoe. The cloth 5 that is arranged in the openings in the body is preferably adapted for rubbing the soles of the shoe while the cloth arranged in the openings in the flange serves to good advantage when cleaning or drying the sides or the heel of a shoe. The cloth in the flange in the lug is employed when cleaning and drying the shoe between the sole and the upper.

In order to readily manipulate the cleaner I have preferably formed integral with the inner end of the body a longitudinally extending handle 6, the free end of which has an opening 7 therein which permits of the entire device being suspended from a suitable supporting element when not in use. In Fig. 3 of the drawings I have shown a detachable handle 6$^a$ having an opening 7$^a$, connection being maintained between the handle and the body by means of screws or like fastening devices 8. In order that the device may be employed for scraping shoes I have beveled the free longitudinal edge of the body to provide a cutting blade 9. Incidentally this blade can be used for cutting and dressing fowls.

In Fig. 4 I have shown the blade 9ª detachably secured to the body 1ª by means of screws or other suitable fastening devices 10. By having this blade detachable, the same can be formed of better material thus rendering it more suitable when dressing poultry. As is apparent the rest of the structure with the exception of the opening 4ᵇ is similar to that shown in Fig. 1.

For the purpose of providing a suitable brush means for thoroughly cleaning shoes or the like of hardened earth after it has been partially scraped by the cutting edge, as shown in Fig. 5, I have provided the surface of the body opposite to that from which the flange and lug extend, with a longitudinal groove 10. Associated with this groove is the brush including a body 11 having bristles 12 extending therefrom. The body being preferably removably retained within the groove by means of the screws 13, shanks 14 of which pass through the body and engage the under surface of the body. As is apparent this brushing means can be readily used when dressing poultry. It can be removed and sterilized and then replaced or else another brush of a similar construction can be inserted and used solely for this purpose. The parts employed in conjunction with the brush are similar to the parts of Fig. 1, with the exception of the opening 4ᶜ.

Although I have shown and described the preferred embodiment of my invention I desire it to be understood that I am not to be limited to the exact details shown. However, I desire that great stress be laid upon the arrangement of the body with the cloth cleaning means thereon as well as the arrangement of the removable brush and knife features.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only, the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A device of the character described including a body provided with openings adjacent one longitudinal edge, a flange integral with and projecting at right angles from the edge of the body adjacent the openings and provided with a plurality of openings, the openings in said body and flange being adapted to have a single piece of cloth removably interwound therein.

2. A device of the character described including a body having a plurality of uniformly spaced openings therein, a flange formed on one side of the body at right angles and provided with a plurality of uniformly spaced openings positioned adjacent the openings in the body, a lug projecting from one end of the body and at right angles thereto and provided with an opening, the openings in the body, flange and lug being adapted to have a single piece of cloth removably interwound therein, and a handle associated with the opposite end of the body.

3. A cleaning implement of the character described comprising a substantially flat body member having a plurality of uniformly spaced openings therein, a flange projecting from and extending at an angle to said body member and having a plurality of uniformly spaced openings, the openings in said body and said flange being arranged to have a cloth removably interwound therein, and a handle connected to one end of the body.

In testimony whereof I affix my signature in presence of two witnesses.

MATTIE M. ENDERS.

Witnesses:
Jos. Bosts,
Dan Melshu.